United States Patent
Marshall et al.

(10) Patent No.: US 9,483,790 B2
(45) Date of Patent: Nov. 1, 2016

(54) SYSTEMS AND METHODS FOR PROVIDING GOODS

(71) Applicants: Vincent Lincoln Marshall, Almeda, CA (US); Eric Shepard Gocke, Media, PA (US); Michael William Tieff, II, Philadelphia, PA (US)

(72) Inventors: Vincent Lincoln Marshall, Almeda, CA (US); Eric Shepard Gocke, Media, PA (US); Michael William Tieff, II, Philadelphia, PA (US)

(*) Notice: Subject to any disclaimer, the term of this patent is extended or adjusted under 35 U.S.C. 154(b) by 396 days.

(21) Appl. No.: 13/968,777

(22) Filed: Aug. 16, 2013

(65) Prior Publication Data
US 2014/0052498 A1    Feb. 20, 2014

Related U.S. Application Data

(60) Provisional application No. 61/684,666, filed on Aug. 17, 2012.

(51) Int. Cl.
| | |
|---|---|
| G06F 7/00 | (2006.01) |
| G06Q 30/06 | (2012.01) |
| G06Q 10/08 | (2012.01) |
| G07F 17/00 | (2006.01) |
| G07F 11/00 | (2006.01) |
| G07F 11/16 | (2006.01) |
| G07F 11/28 | (2006.01) |

(52) U.S. Cl.
CPC ........ *G06Q 30/0635* (2013.01); *G06Q 10/087* (2013.01); *G07F 11/00* (2013.01); *G07F 11/165* (2013.01); *G07F 11/28* (2013.01); *G07F 17/0064* (2013.01)

(58) Field of Classification Search
CPC .... G06Q 10/087; G06Q 10/08; A61J 7/0084
USPC .......................................................... 700/216
See application file for complete search history.

(56) References Cited

U.S. PATENT DOCUMENTS

| | | | |
|---|---|---|---|
| 5,379,229 A * | 1/1995 | Parsons | B65G 1/1378 414/273 |
| 6,377,867 B1 | 4/2002 | Bradley | |
| 6,682,289 B1 | 1/2004 | Credle | |
| 6,876,978 B1 * | 4/2005 | Walker | G06Q 10/087 705/14.1 |
| 2002/0113075 A1 * | 8/2002 | Chirnomas | G07F 5/18 221/9 |
| 2002/0194074 A1 * | 12/2002 | Jacobs | G06Q 20/20 705/16 |
| 2005/0139662 A1 * | 6/2005 | Eglen | G06Q 30/06 235/383 |
| 2007/0284442 A1 * | 12/2007 | Herskovitz | G06Q 20/18 235/383 |
| 2008/0093371 A1 | 4/2008 | Ubidia | |
| 2009/0076650 A1 | 3/2009 | Faes | |
| 2009/0076925 A1 * | 3/2009 | DeWitt | G06Q 10/087 705/26.1 |
| 2010/0030667 A1 * | 2/2010 | Chudy | G06F 19/3462 705/28 |
| 2012/0143693 A1 | 6/2012 | Chung | |

* cited by examiner

*Primary Examiner* — Kyle Logan
(74) *Attorney, Agent, or Firm* — Michael W. Tieff

(57) ABSTRACT

A robobox may automate all of the functions of a retail store, combining the best of online and traditional retail in a platform that costs significantly less to operate than a brick and mortar store while providing greater availability, a more predictable experience, and instant gratification to the shopper. Customers may use a touch screen interface to choose products from an inventory of the robobox. They may also place orders in advance through the web or with mobile devices. As soon as an order is completed and the payment has been collected electronically, the inner workings of the robobox pick the items in the order and may deliver it to the customer on-site.

20 Claims, 7 Drawing Sheets

100

200

SYSTEMS AND METHODS FOR PROVIDING GOODS

CROSS-REFERENCE TO RELATED APPLICATIONS

This application claims priority to U.S. Patent Application No. 61/684,666, filed Aug. 17, 2012, which is incorporated by reference in its entirety.

BACKGROUND

In recent years, consumers have been moving away from traditional brick and mortar retailers and more towards online retailers such as Amazon. Consumers can shop from online retailers from virtually any location and at any time, providing convenience that traditional retailers cannot match. Further, the lack of costly real-estate and fewer employees, allows online retailers to provide pricing that is better than traditional retailers, even when shipping costs are considered.

However, traditional retailers may still have some advantages over online retailers. One such advantage is that traditional retailers are able to provide goods immediately to shoppers who may be unable or unwilling to wait for an item purchased from an online retailer to be shipped. Another advantage is that many consumers may be untrusting of online shopping in general.

Thus, what is needed are systems that combine the conveniences and cost savings of online retailers with the advantages of traditional retailers.

SUMMARY

A robobox may automate all of the functions of a retail store, combining the best of online and traditional retail in a platform that costs significantly less to operate than a brick and mortar store while providing greater availability, a more predictable experience, and instant gratification to the shopper. Customers may use a touch screen interface to choose products from an inventory of the robobox. They can also place orders in advance through the web or with mobile devices. As soon as an order is completed and the payment has been collected electronically, the inner workings of the robobox pick the items in the order and deliver it to the customer on-site. These interfaces do more than simply allow the shopper to browse and purchase items; they can also make suggestions, answer certain questions, display photorealistic 3D models, and more.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
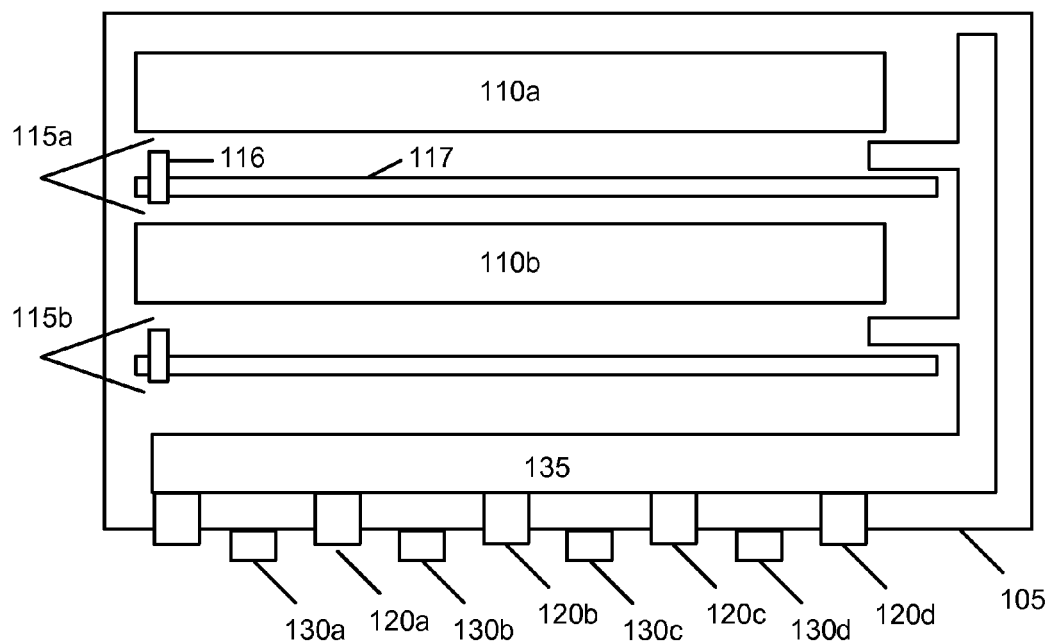
FIG. 1 is an illustration of a top view of an example robobox.

FIG. 1 is an illustration of a top view of an example robobox 100. The robobox 100 includes a housing 105. The housing 105 may be constructed from a variety of materials including metal, wood, plastic etc. The housing 105 may include at least one transparent portion or side so that customers may view the contents and/or operations of the robobox 100 from outside of the robobox 100. In some implementations, the housing 105 may be approximately the same size as a shipping container, allowing the robobox 100 to be easily transported. Alternatively, the housing 105 may be smaller so that the robobox 100 may be easily placed within, or in front of an existing retail establishment. In some implementations, the robobox 100 may include no housing and may be placed directly into a retail establishment.

The robobox 100 may further include one or more shelf assemblies 110a and 110b (collectively referred to as shelf assemblies or assembly 110). Each shelf assembly 110 may store one or more items or consumer products that are available for sale from the robobox 100. Each shelf assembly 110 may include a plurality of shelves. The shelves of each shelf assembly may be adapted to hold one or more items that are available to purchase from the robobox 100. These items may include a variety of consumer goods including perishable and non-perishable items. All of the items stored in the robobox 100 are collectively referred to as the inventory.

As described further below, each of the items of the inventory may be stored in a bin or container that is adapted to be placed on a shelf of a shelf assembly 110. Alternatively, the items may sit directly on the shelves without a bin. Each bin may be sized based on the item that it contains. A variety of different bin sizes may be used in each shelf assembly 110. Each shelf of a shelf assembly 110 may further include bins of different sizes. Example bins include Akro-Mils AkroBins. Other types of bins may be used.

Each shelf assembly 110 may be constructed from a variety of materials such as wood, metal, plastic etc. The shelf assemblies 110 may be staggered such that some or all of the items available on each shelf assembly 110 is visible to a consumer through the transparent portion of the housing. Alternatively, only the contents of the shelf assembly 110 may be visible. While only two shelf assemblies 110 are shown, it is for illustration only; there is no limit to the number of shelf assemblies 110 that may be supported.

The robobox 100 may further include one or more pickers 115a-b (collectively referred to as pickers or picker 115). Each picker 115 may include a grabber assembly 116 (such as a claw) and may be adapted to use the grabber assembly 116 to grasp and remove an item (or bin) from one of the shelf assemblies 110. Each picker 115 may further include a movement means 117 (such as a rail or a series of rails), that may allow the grabber assembly 116 to travel the length of the shelf assemblies 110 to remove a desired item. The movement means 117 may allow the grabber assembly to move in three dimensions with respect to the shelf assemblies 110. Each shelf assembly 110 may have one or multiple pickers 115.

The picker 115 may place a removed item on a conveyor 135. The conveyor 135 may be series of conveyor belts, or other conveyance means, that is adapted to move the picked items (with or without a bin) through the robobox 100. As shown, each of the pickers 115 has an adjacent section of the conveyor 135.

The conveyor 135 may move a removed item or bin to one or more order chutes 120a-d (collectively referred to herein as the chute or chutes 120). Each chute 120 may be a door or other opening in the housing 105. One or more customers may receive items through a chute 120. While only four chutes 120 are shown, it is for illustration only; there is no limit to the number of chutes 120 that may be supported.

In implementations where the item is stored in a bin, the item may be delivered to the customer in the bin through the chute 120. The customer may then return the bin to an area created to receive used bins outside of the robobox 100, or the customer may keep the bin. In such embodiments the bin may include advertising to offset the cost of the bin. Alternatively, the picker 115 may dump the item onto the conveyor 135 and may place the used bin in an area of the robobox 100 reserved for used bins, may return the used to bin to the shelf that the bin was originally removed from, or may place the bin in a region of a shelf or shelves reserved for used bins.

The robobox 100 may further include a plurality of customer ordering interfaces 135a-d (collectively referred to as the customer ordering interfaces or interface 135). The customer ordering interface 135 may include a touch screen, or other interface, and may allow customers to search for and view the items that are currently in the inventory of the robobox 100. The customer may then select a desired item or items, from the touch screen, and may provide payment to the customer ordering interface 135 through a credit card reader and/or currency acceptor. Alternatively, the customer may provide payment by selecting a credit card, bank account, or other payment source associated with the customer.

The customer ordering interface 135 may then instruct the customer which chute 120 that the item will be delivered to. In addition, the customer may be provided with an estimated time when the order will be ready for pick up. The customer ordering interface 135 may then instruct the appropriate picker 115 and the conveyor 130 which item/bin to select, and which chute 120 to use for delivery. Where an order includes multiple items, the customer ordering interface 135 may instruct multiple pickers 115 to fulfill the order. The customer ordering interface 135 may be implemented using a variety of computing devices and operating systems. Each customer ordering interface 135 may be implemented using one or more general purpose computing devices such as the computing device 700 illustrated with respect to FIG. 7.

In some implementations, the robobox 100 may be used to supplement existing locations for a retailer. The robobox 100 may be placed in front of, or inside of, an existing retail store and its inventory may include many popular items sold by the retailer. Customers may then purchase the items from the robobox 100, rather than from the retail location, which may reduce the overall workload of the retail employees (i.e., cashiers). Moreover, because the robobox 100 is completely automated, the robobox 100 may be used by customers even when the retail location is otherwise closed.

The robobox 100 may further be used to provide new retail locations for a retailer, but at a lower cost than traditional retailers. For example, a robobox 100 may be placed in a mall, parking lot, or any other location giving a retailer an immediate presence in the area without the expenses and risks associated with establishing a new retail location.

Figure 2:
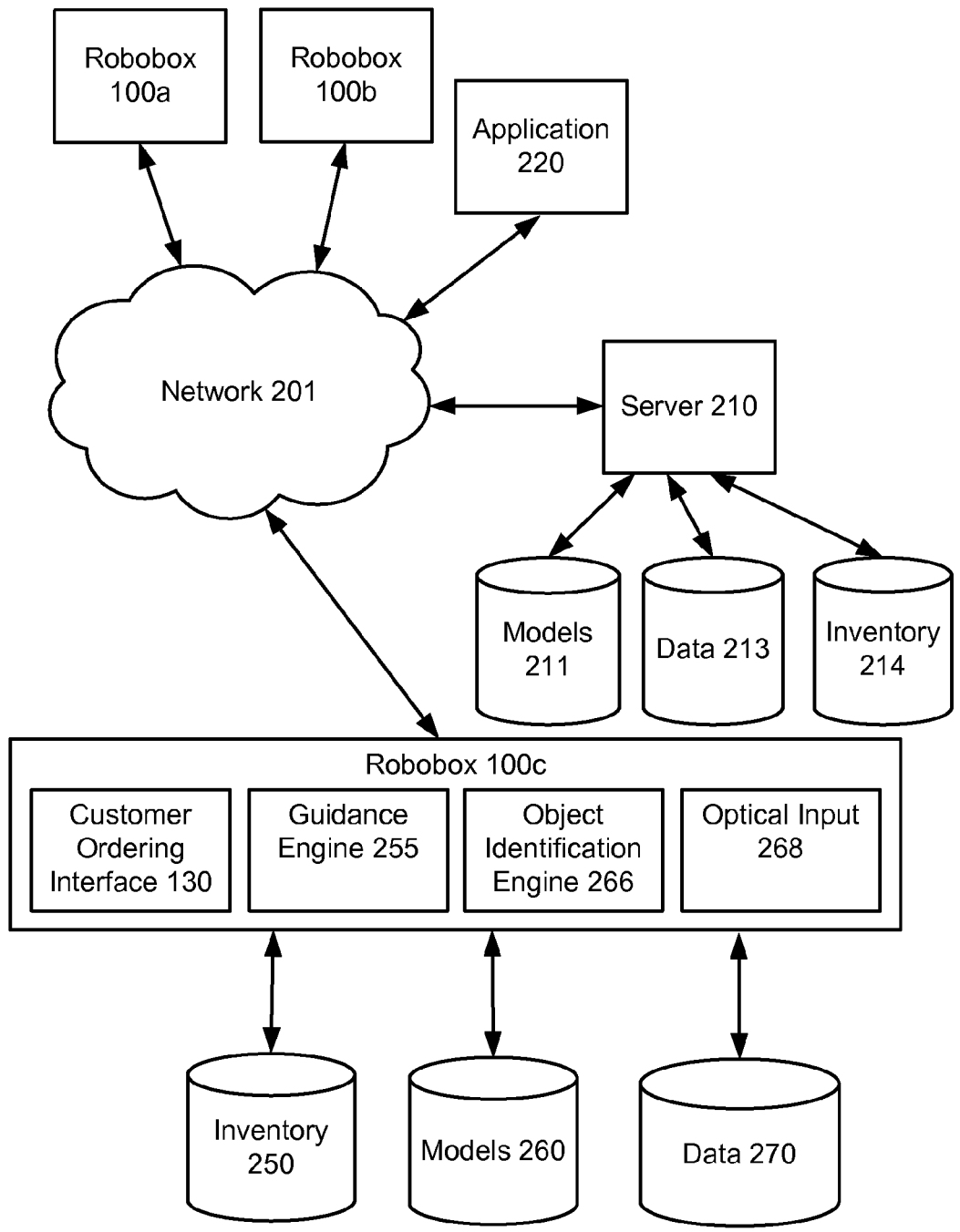
FIG. 2 is an illustration of an example environment.

FIG. 2 is an illustration of an example environment 200. As shown, the environment 200 includes a plurality of roboboxes 100a-c (collectively referred to as robobox 100 or roboboxes 100). The roboboxes 100 may be distributed across a geographic area and may be connected to a network 201. The network 201 may include a variety of public and private networks such as the Internet, for example. Each of the roboboxes 100 may connect to the network 201 using a variety of connection methods including Wi-Fi, cellular, conventional telephone networks, and satellite, for example. Each robobox 100 may be continuously connected to the network 210, or may periodically connect to the network 201. While only three roboboxes 100 are shown, it is for illustrative purposes only; there is no limit to the number of roboboxes that may be supported.

The roboboxes 100 may communicate through the network 201 with one or more servers 210. The server 210 may be associated with the retailer or company that controls or manages each of the roboboxes 100. As shown, the server 210 may maintain information such as an inventory 214. The inventory 214 may be a database and may include inventory information about the items that have been sold, or that remain unsold, at each of the roboboxes 100. Such inventory information may be received and compiled automatically from each robobox 100, or may be requested periodically from each robobox 100 by the server 210. Other information such as user browsing behavior and sales data may also be transmitted.

The server 210 may process the inventory 214 to perform a variety of services to the roboboxes 100. In some implementations, the server 210 may determine when the inventory of a particular robobox 100 needs to be replenished. In addition, the server 210 may use the inventory 214 to determine which items of the roboboxes 100 is selling the best, and may adjust the inventory of the roboboxes 100 accordingly. As may be appreciated, the server 210 may customize the inventory for each particular robobox 100 based on the items that are selling at each particular robobox 100.

In some implementations, the inventory 214 and other transmitted data can be aggregated over geographic areas, customer demographics (as determined by rewards card membership, social media, or facial recognition), time of day, etc. This data can be used to determine optimal items to keep in inventory in each robobox 100, dynamically determine pricing for items in each robobox 100 based on predicted demand as well as knowledge regarding current supply, and to determine additional items to offer to users based on their purchasing history or the purchasing history of others.

As described above, each user may interact with the robobox 100 though the customer ordering interface 135. As shown with respect to the robobox 100c, each robobox 100 may include additional components that may help to improve the overall user experience. These include, but are not limited to, a guidance engine 255, and an object identification engine 266. Each of the guidance engine 255 and the object identification engine 266 may be executed by the same or different computing device used to implement the customer ordering interface 135. Alternatively, or additionally some or all aspects of the guidance engine 255 and the object identification engine 266 may be implemented by the server 210.

The guidance engine 255 may control the user experience provided by the customer ordering interface 135. The user experience may be designed to replicate a knowledgeable and helpful salesperson. In some implementations, the guidance engine 255 may be programmed to answer one or more questions from the customers of the robobox 100. The questions may be typed into the customer ordering interface 135 by the user, or spoken by the user into a microphone associated with the customer ordering interface 135. Alternatively, the question may be selected from a list of common questions or topics that are displayed to the user. The guidance engine 255 may answer the question using a database of predetermined responses from a data 270, and may recommend one or more items to the user from the inventory of the robobox 100. The predetermined responses stored in the data 270 may be received from the server 210 from data 213 maintained by the server 210. Alternatively, the guidance engine 255 may interact with the user using an expert system. The expert system may be based on one or more models 260. The models 260 may be received from the server 210 from models 211 maintained by the server 210, for example.

For example, consider a robobox 100 placed in front of hardware store. When a user approaches or activates the customer ordering interface 135 of the robobox 100, the user may be asked (through a speaker or through a prompt on a screen) if they need help with something in particular. The user may respond (either by speaking or entering text) that they need supplies to make a drywall repair. The guidance engine 255 may then process the user response (using speech or text processing along with one or more models 260) and may determine that the user is interested in making a drywall repair. Accordingly, the guidance engine 255 may display products from the inventory of the robobox 100 (i.e., items identified in inventory 250) that may be used for a drywall repair such as spackle, and a trowel. If the user opts to purchase one or more of the displayed item, the items may be provided to the user by a picker 115 through a chute 120.

In addition, the guidance engine 255 may further offer the user printed instructions related to drywall repair or may offer the user a link to one or more instructional videos or text related to drywall repair. The guidance engine 255 may also offer the user a coupon for a future paint purchase to complete the drywall repair. The guidance engine 255 may print the coupon, or may send the coupon to a user provided email address. The offers provided to a user may be based on information stored in the data 270.

Where an item that a user requests in no longer part of the inventory 250, the guidance engine 255 may offer to place an order for the item. The item may be sent directly to the user, or may be delivered to the robobox 100 for later pickup by the user. When the item enters the inventory 250, the guidance engine 255 may email or otherwise contact the user that the item is available. Alternatively, or additionally, the guidance engine 255 may ask the server 210 to identify one or more other roboboxes 100 whose inventory 250 indicates that they have the item in stock.

The guidance engine 255 may further identify customers, both new and repeat, to deliver a customized shopping experience to users. New customers can be identified with computer vision software to discern age, gender, even mood. Returning customers can be identified by credit card information, "Rewards Cards," or a login. Once a customer has been identified, guidance engine 255 may make suggestions for items to purchase based on demographics (e.g. women may see different impulse items at checkout than men), purchase history (e.g. suggest vitamins when it has been about a month since the last purchase), local shopping trends (e.g. sun block has been popular at this and other local robobox 100 stores lately), chain-wide shopping trends (e.g. people who looked at this item bought the following, or aspirin is popular in the mornings), or promotions (e.g., soap is on sale this week). The information used by the guidance engine 225 to recommend items for purchase may be received from the server 210 and stored in the data 270, for example.

In another implementation, the customer ordering interface 135 may further integrate with an object identification engine 266. The object identification engine 266 may identify objects or items placed on or near an optical input 268. The optical input 268 may be one or more scanners or digital cameras, for example. Other types of inputs may be used. In some implementations, the user may place a desired object on the optical input 268. The object identification engine 266 may receive a digital representation of the object (e.g., one or more images) and may then process the digital representation to determine one or more features of the object. The object identification engine 266 may search a database of objects (i.e., the data 270) for items using the features, and may identify any objects or items that match the determined features.

If the identified objects or items are part of the inventory of the robobox 100, the customer ordering interface 135 may then ask the user if they would like to purchase the object or item from the robobox 100. Otherwise, the customer ordering interface 135 may offer to ship the item or object to the user, may offer to provide the item to the user at a later date for pickup at the robobox 100, or may determine a different robobox 100 that has the item or object in stock.

For example, a user may bring a broken light bulb to the robobox 100. The user may place the bulb on the optical input 268, where a digital image is generated. The object identification engine 266 may identify features of the light bulb from the image such as size, number of threads, bulb type, size or type of terminal, etc. The object identification engine 266 may then determine a light bulb from the inventory 250 that corresponds to the identified features. If the light bulb is in the inventory of the robobox 100, the light bulb may be recommended to the user for purchase. If the light bulb is not in the inventory of the robobox 100, then the interface 135 may provide the user with an option to pick up the bulb at a later time, may allow the user to order the bulb for home delivery, or may provide the user with a retail location or other robobox 100 where the light bulb may be purchased. For example, the robobox 100 may have access to the inventory of other roboboxes 100 and corresponding retail locations. Other objects that may be identified by the robobox include tools and fasteners (i.e., bolts, nails, and screws), for example.

Alternatively, or additionally a customer may interact with the robobox 100 using an application 220. The application 220 may be executed by a smart phone, tablet, or any other computing device. The application 220 may also be provided as a website and may be executed in part by a web browser.

For example, a user may use their mobile device to order a particular item using the application 220. When the user searches for an item using the application 220, the user may be presented with the locations of one or more roboboxes 100 where the item may be picked up by the user right now. The locations may be ordered based on the current location of the user (based on the location of the user's mobile device or an entered zip code). Thus, as may be appreciated, the robobox 100 may allow a retailer to combine the convenience of online shopping with the instant gratification associated with brick-and-mortar shopping.

Similarly, the object identification and expert system features of the guidance engine 255 and object identification engine 266 described above may also be incorporated into the application 220. For example, a user may use the camera of their mobile device to take a picture of broken screw or other product, and may receive an identification of the screw, along with a list of roboboxes 100 where the screw may be purchased by the user.

Whether through the customer ordering interface 135 or application 220, the user interface used to access each robobox 100 is entirely digital and, as such, can implement e-commerce features that would otherwise be very difficult or impossible to effect in traditional brick and mortar retail. Pricing, promotions, suggestions, etc. can be changed on a per customer basis to customize the experience for each customer, to optimize pricing and promotions for the current conditions (time of day, etc. . . . ), or to do market research and A/B testing. Item suggestions and even the organization of the items in the robobox 100 can be updated in real time in response to the browsing behavior of customers. Customer behavior can be tracked beyond purchases all the way down to browsing behavior. For example, how long did they look at an item in the robobox 100 interface 135 and what did they buy instead? Digital coupons can be tracked through to a purchase to provide ROI information to the store and advertisers. Such customer information may be stored by a robobox 100 with the data 270 and periodically sent to the server 210 for storage and analysis.

Figure 3:
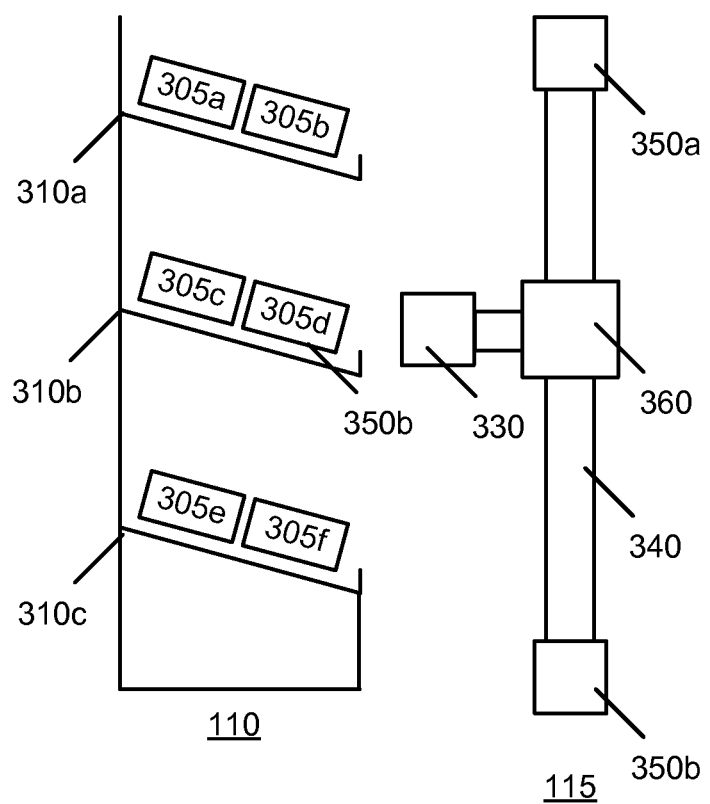
FIG. 3 is an illustration of an example shelf assembly and picker.

FIG. 3 is an illustration of an example shelf assembly 110 and picker 115. The shelf 110 includes a plurality of shelves 310a-c (collectively referred to herein as the shelf or shelves 310). Each shelf 310 may include a plurality of bins 305a-f (collectively referred to herein as the bins 305 or bin 305). More or fewer bins 305 and shelves 310 may be supported.

The picker 115 may include a grabber assembly 116 and a movement means 117. The grabber assembly 116 may include a grabbing means 330 connected to a y-axis carriage 360. The y-axis carriage 360 is adapted to move vertically up and down a y-axis member 340 of the movement means 117. The y-axis member 340 is connected to x-axis carriages 350a and 350b of the movement means 117. The x-axis-carriages 350a and 350b are adapted to move along x-axis members (not pictured) of the movement means 117 that run in front of each shelf assembly 110 in the robobox 100. The grabbing means 330 is adapted to move perpendicular to the x-axis and y-axis members to grip or grasp a particular bin 305. As may be appreciated, the x-axis carriages 350a and 350b, and the y-axis carriage 360, allow the grabbing means 330 to be positioned in from of any bin 305 and/or shelf 310. The grabbing means 330 may be any grabbing means that can be used to grip each bin 310 and or item. Examples include, but are not limited to, a claw or a magnetic device, for example.

The inventory is arranged on the shelves 310 inside the robobox 100, accessible via an automated handling system (i.e., the pickers 115). Each item may be placed in a bin 305, which may allow the automated equipment to handle items of a variety of shapes and sizes. Items may be unitized in size and shape by way of these bins 305. As a result, the picker 115 and other inventory handling equipment only need to be designed to deal with the form factor(s) of the bins 305 but can handle items of varied shapes and sizes.

Several sizes of bins 305 may be used so that items can be matched to appropriately sized bins, maximizing storage space. In some implementations, multiple quantities of each item are stored on shelves 310 in rows several items deep; as the bin 305 containing a first item is picked, the remaining bins 305 slide forward on the inclined shelf 305 into picking position.

In a robobox 100 built inside a 40' shipping container, for example, shelves holding the inventory may be 8' tall and nearly 40' long on both sides of the robobox 100. A lip on the front of each inclined shelf 305 may retain the bins 305 on each shelf 310. To retrieve an item, the picker 115 lifts a bin 305 slightly before drawing it forward off of the shelf 310. When placing a bin 310 onto a shelf, the picker 115 may positions the bin 305 such that it will clear the shelf lip, inserts the bin 305 onto the shelf 310, and lowers the bin 305 onto the shelf 310 so that the lip will retain it. A bin 305 inserted into a shelf 310 that already has existing bins 305 may push those bins 305 backwards on the shelf 310. The customer ordering interface of 135 may know the positions of each bin 305 in the robobox 100 and may prevent the overfilling of any shelf 310.

An alternate implementation may include some means of movement for the bins 305 in the shelves 310, such as a piston or spring behind the bins 305, powered rollers below or along the side of the bins 305, or some other mechanism that acts on the bins 305 from above. In such an implementation, the lip at the front of the shelf 310 may not be necessary and the bin picking and placing operation may be slightly different, as the bins 305 can be fed at least partially in and out of the shelves 310 via the mechanisms incorporated into the shelves 310.

As described above, the picker 115 may be a bin picking robot and may move in the aisle(s) between the shelf assemblies 110, and may be able to place itself directly in front of any bin 305 position on the shelves 310. The picker 115 may move in 4 axes—an x-axis along the length of the shelf assemblies 110, a y-axis along the height of the shelf assemblies 110, a z-axis with a limited extension into the shelves 310 used to pick and place bins 305, and a rotary axis used to dump the contents of a bin 305 onto the conveyor 130.

In addition to these four axes, the picker 115 may have two additional degrees of freedom through the grabbing means 330. Where the grabbing means is a claw, the claw may include an upper jaw portion and a lower jaw portion pivotally connected by a pivot. A gap between the upper jaw portion and the lower jaw portion may be increased or decreased to accommodate bins 305 of different sizes. The claw may then clamp down the upper jaw portion and the lower jaw portion to grasp a bin 305. In addition, the lip of each shelf 310 may include a notch or gap to allow the lower jaw portion to connect with the bin 305 through the lip. Alternatively or additionally, the claw may include a left and right jaw portion that acts to grasp the right and left size of the bins 305.

In high throughput situations, multiple bin pickers 115 may work in concert on the same shelf assembly 110 either by segregating the shelf space into multiple separate domains or by getting skinny—rotating the grabber assemblies 116 to vertical—as the pickers 115 move past each other. In some implementations, bins 305 may be placed on shelves 310 with the most frequently accessed bins 305 closest to the drop-off point on the conveyor 130 in the interest of bin-picking speed. This placement can be continuously updated in the downtime between orders based on the current and expected future sales trends, number of different items in inventory, quantities of each type of item in inventory, and other characteristics.

In some implementations, the conveyors 130 inside the robobox 100 may be used to transport items to and from the pickers 115. To fulfill orders, the pickers 115 pick bins 305 from the shelves 310 and deposit items from the bin 305 onto the conveyor 130 which carries the items towards the chutes 120. Depositing items from a bin 305 onto a conveyor 130 may be accomplished by rotating the gripper means 330 to empty the contents of the bin onto the conveyor 130. Intelligence in this conveyor 130 allows items from multiple orders picked simultaneously to find their way to the correct chute 120. Some mechanism may be included in the conveyor 130, attached to the conveyor 130, or added separately that allows orders to be stored for a period of time after picking for a later pickup.

Figure 4:
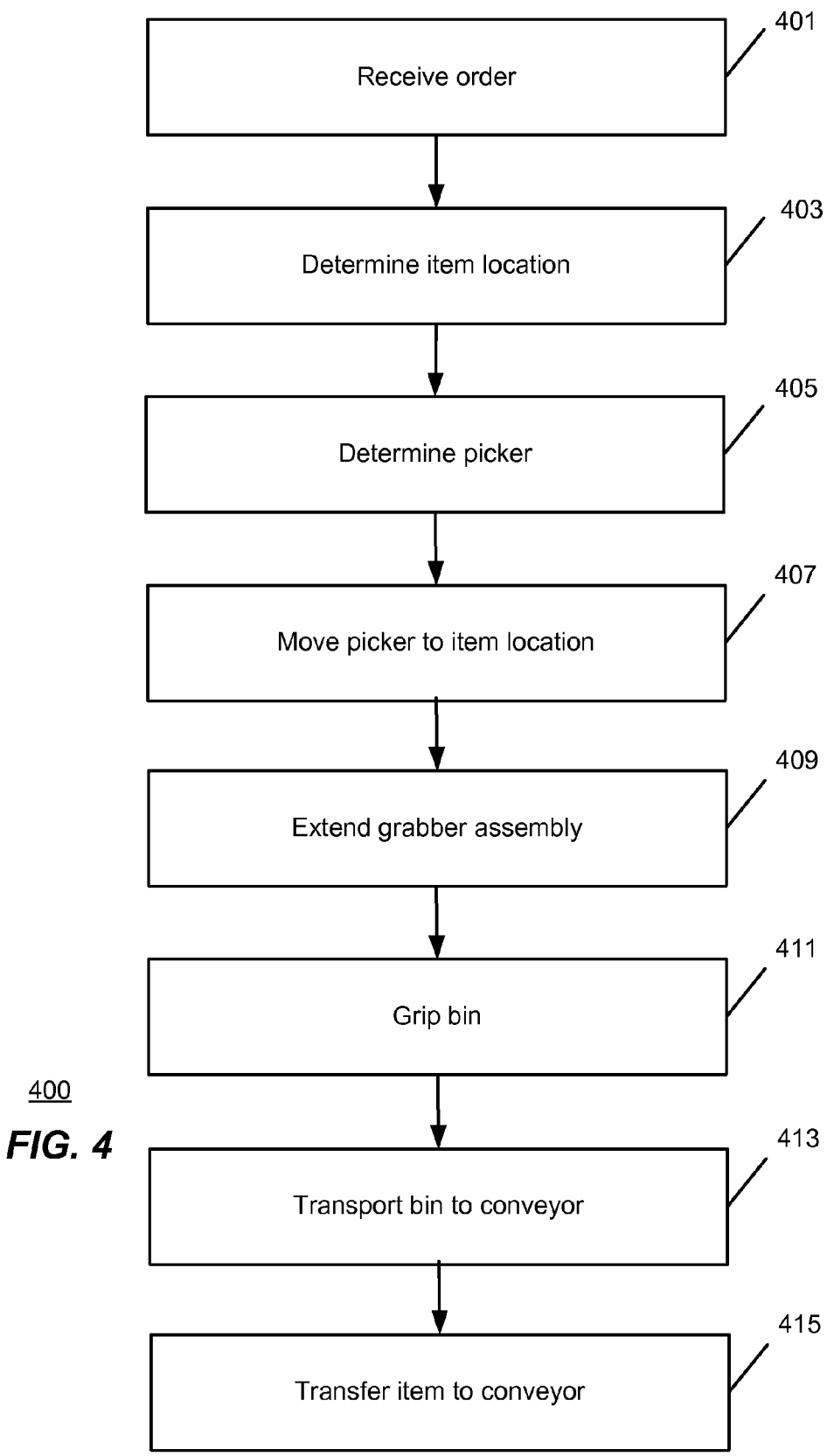
FIG. 4 is an illustration of an example method for purchasing an item from a robobox.

FIG. 4 is an illustration of a method 400 for fulfilling an item order by the robobox 100. An order is received at 401. The order may be received from a customer through the customer ordering interface 135, or through the application 220. The order may be for a single item or for multiple items.

A location of the item is determined at 403. The location of the item may include the shelf 310 and/or bin 305 that includes the item. The location of the item may be determined by the customer ordering interface 135 based on the inventory 217, for example.

A picker that can collect the item is determined at 405. The determination may be made by the customer ordering interface 135 based on the location of the item and/or the locations of the pickers 115 in the robobox 100. For example, the interface 135 may determine the picker 115 that is closest to the item or the picker 115 that is not currently working. Alternatively, each picker 115 may service a designated set of bins 305 or shelf 310 locations, and the interface 135 may determine the picker 115 by determining the picker 115 that is assigned to the item location.

The determined picker 115 moves to the item location at 407. The picker 115 positions itself to grip the bin 305 that includes the item at 509. The grabber assembly 116 may also resize itself to grab a size slightly larger than the bin 305 or item.

The picker 115 extends the grabber assembly 116 to the shelf 310 that includes the bin 305 that includes the item at 409. The picker 115 grips the grabber assembly 116 around the bin 305 that contains the item at 411. The picker 115 lifts the bin 305 so that it will clear the lip at the front of the shelf 310 and extracts the bin 305 from the shelf 310. The speed is controlled to control the motion of the existing bins 305 behind the extracted bin 310 in the shelf 305.

The picker 115 transports the bin 305 to a conveyor 130 at 413. As described above, there may be many conveyors 130, the appropriate conveyor 130 may be chosen based on a variety of criteria including current picker 115 position, customer position (i.e., chute 120), characteristics of this item and/or this order, and characteristics of other items and/or orders being picked.

The item is transferred from the bin 305 to the conveyor 130 at 415. In some implementations, the item may be transferred by the picker 115 rotating the grabber assembly 116 so that the item drops or rolls out of the bin, potentially through some guiding mechanism(s), and onto the conveyor 130. The conveyor 130 may then transports the item either directly to the customer via a chute 120 or to an area of the robobox 100 where the order is staged and/or stored before delivery.

Where there are multiple items in an order, the method 400 may return to 403 to select the next item from the order. Depending on the implementation, the items may not be provided to the customer until all of the items in the order have been picked. In addition, one or more items in order may be picked or selected by multiple pickers 115 simultaneously.

As described above, inventory and sales data may be transmitted to a system 210 to provide an indication of when restocking of the inventory of the robobox 100 is needed. Selecting items to replenish the robobox 100 may be done manually or automatically, depending on the store owner and their level of investment in automation. In either scenario, a computer generated pick list eliminates a major potential source of error in the restocking process. Once picked, the items for restocking are delivered to the robobox 100 where an employee of the store or a third party contractor may use a special passcode, key, or other security device, to put the robobox 100 into a restocking mode.

Restocking mode is yet another automated process that may reduce both inventory management errors and the potential for theft by employees. After putting the robobox 100 into restocking mode, the person doing the stocking may scan each item's UPC barcode and place the item onto the conveyor belt of the robobox at one of the chutes 120. A manifest for the items to be stocked may have already been downloaded automatically to the robobox 100 from the server 210.

Using that manifest, the robobox 100 has information on each incoming item including the size, weight, and other characteristics as well as expected sales volume data. From that data, the robobox 100 can select an appropriately sized bin 305 and shelf 310 for the bin 305 containing the item. The bin 305 may be chosen based on the size and weight of the item. The positioning of items on the shelves 310 is chosen, and can be continually updated, based on sales projections computed for the item from the real time browsing and shopping data gathered by the roboboxes 100 and/or the server 210, number of different items in inventory, quantities of each type of item in inventory, and other characteristics.

Because a manifest listing all items in the restocking may have already been downloaded to the robobox 100, each item is checked as it is loaded. Any unexpected items will be flagged and rejected. Missing items may be reported to the appropriate party. The former reduces mistakes and the latter discourages employee theft.

Figure 5:
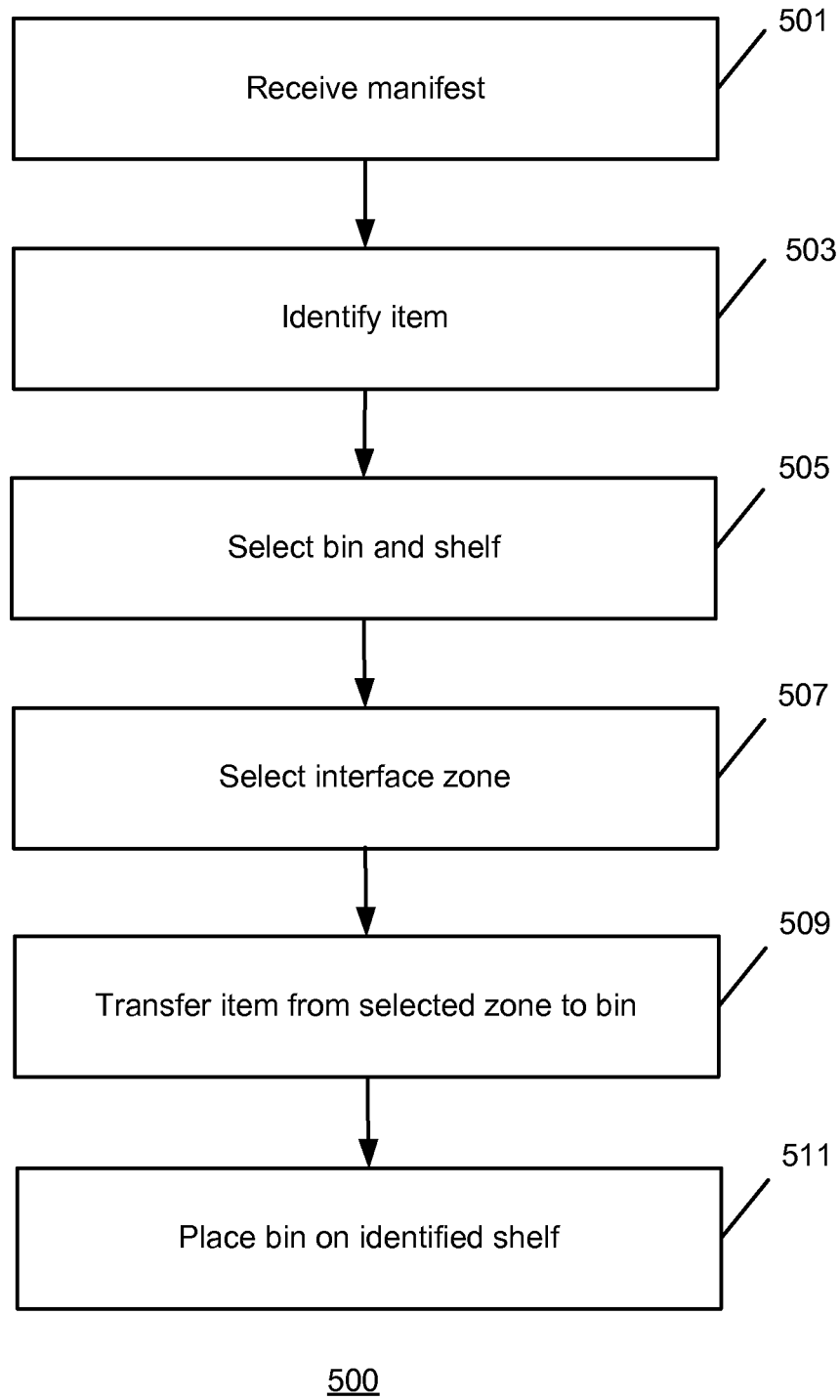
FIG. 5 is an illustration of an example method for loading a robobox.

FIG. 5 is an illustration of a method 500 for restocking the robobox 100. A manifest is received at 501. The manifest may be list of the items that are expected to be added to the robobox 100. The manifest may be received by the robobox from the server 210, for example.

An item is identified at 503. The item may be identified by the robobox 100 via barcode scanner, near field radio, RFID, vision system, or other means of identification. If the identified item is expected (i.e., part of the manifest), the operator may place the item into one of the chutes 120, or the conveyor 130. The item may then be removed from the manifest. If the identified item is not part of the manifest, the operator may be alerted.

A bin 305 and shelf 310 for the item is selected at 505. The bin 305 and shelf 310 may be selected by the robobox based on size and weight data associated with the item. The size and weight may be determined from information about the item in the manifest, for example. In addition, the shelf 310 used to hold the item may be further dynamically selected based on the popularity of the item or expected popularity of the item based on the most recent sales data. For example, items that are popular are placed close to chute 120 and/or conveyor 130 locations to increase the overall speed of the robobox 100. The robobox 100 may determine probability that the item will be purchased based on inventory or past sales data, and place the item based on the determined probability. For example, items with high probabilities may be placed in locations that are closer to chutes 120, pickers 115, and/or conveyors 130 than items with low probabilities.

A picker 115 and conveyor 130 interface zone is selected at 507. An interface zone may be an intersection between one of the pickers 115 and the one of the conveyors 130. The interface one may be selected based on the bin 305 and shelf 310 location, and the overall busyness of each of the pickers 115. The item is moved on a conveyor 130 to the selected zone.

The item is transferred from the conveyor 130 to the selected bin 305 at 509. In one implementation, the item may roll off of the conveyor (the end or some other exit route), move potentially through some mechanism for guidance, and drop into the selected bin 305. The selected bin 305 may be placed or may be held by a picker 115, for example.

The selected bin 305 is placed on the identified shelf 310 at 511. The picker 115 may move the bin 305 to the position corresponding to the identified shelf 310. The grabber assembly 116 may orient the bin 105 for placement (i.e., sets the correct bin height and angular orientation for placement on the shelf 310). The picker 115 may then lower the bin 305 so that it is retained by the lip in front of the shelf 310. The method 500 may then repeat until all items in the manifest have been placed on shelves 310.

At the end of a restocking session, the robobox knows conclusively what has been stocked by way of the scanned UPC codes. If some errors or missing items could not be reconciled, both the robobox and the backend headquarters have an updated and accurate picture of the actual inventory.

Figure 6:
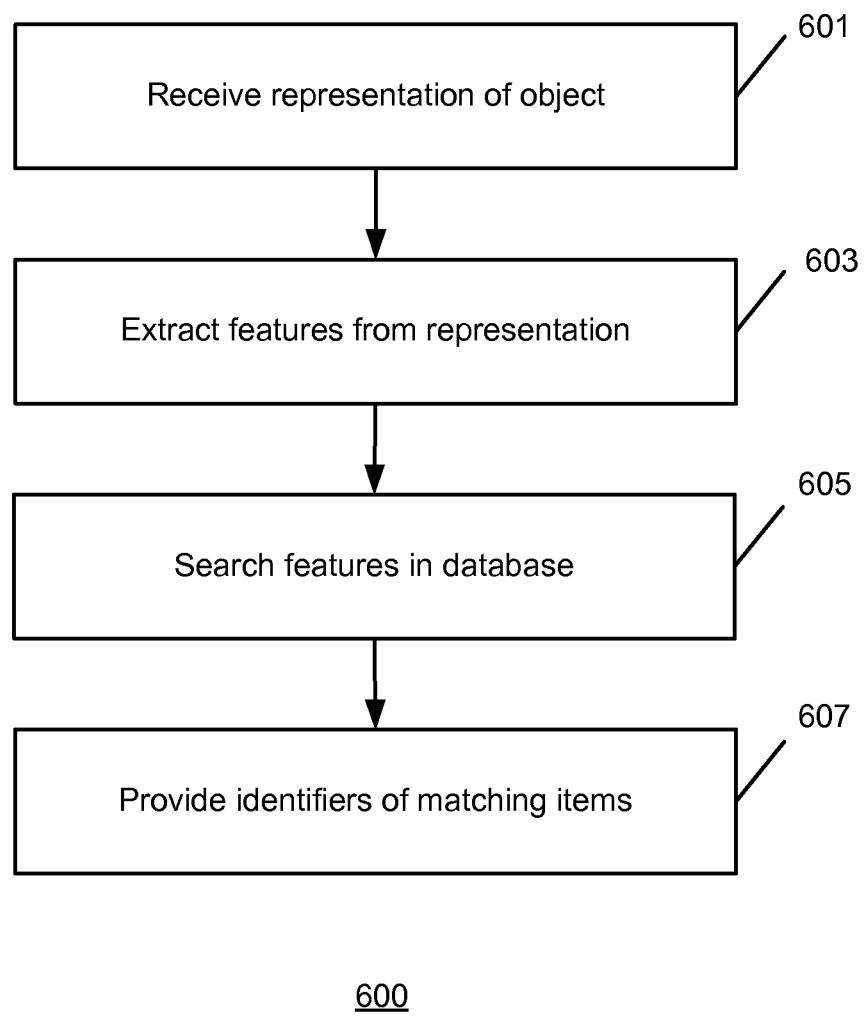
FIG. 6 is an illustration of an example method for identifying an object.

FIG. 6 is an illustration of an example method 600 for identifying an object. The method may be performed by the robobox 100. A digital representation on an item is received at 601. The digital representation may be a digital image and may be received from an optical input 268, such as a scanner or digital camera. For example, a user of the robobox may place an object on a scanner and an image of the object may be generated. Alternatively, a user may take a picture of the object using a digital camera of a mobile phone through the application 220. In some implementations, a category associated with the object may also be received. For example, is the object a light bulb, screw, nail, or nut. The category may be provided by the user.

Features are extracted from the digital representation at 603. The features may be extracted from the representation by the object identification engine 266. The features may include dimensions of the object, a color of the object, or a thread count of the object. Where a category was included, the extracted features may be features that are associated with the item, such as thread count for a screw, and receptacle size for a bulb.

The extracted features are used to search a database of objects at 605. The features may be searched by the object identification engine 266. In some implementations, the search may be performed based on the category associated with the object. The database may be the inventory 250 of the particular robobox 100, or may include other roboboxes 100, or even objects that are not in the inventory of any roboboxes 100.

Identifiers of one or matching objects are presented at 607. The identifiers may be presented on a display of the customer ordering interface 135, or alternatively on the application 220 if a mobile device was used. The identifiers may be displayed with information about each item, and may provide a way for the user to either purchase the item directly from the inventory of the robobox 100 or select the item for delivery to an address associated with the user or a robobox 100. Depending on the implementation, the matching objects may be ranked based on the number of matching features, and may be presented to the user in a ranked order.

As with any retail operation, information on the items in the inventory may be needed for display on the customer ordering interface 135, as well as for selection of bins 305. Because the robobox 100 process is so highly automated, detailed information about the item's size and weight may be used. In addition to this core information, certain retailers may opt for other detailed product information to help customers make a selection—for example, detailed photorealistic 3D models or videos, instructions manuals, lists of what is included and/or what is required, etc. can be provided for display in the interface 135, and stored in the data 270.

A robobox 100 may provide a customer as much information about an item as if he or she took the item out of the box and played with it. All of this information is prepared and entered into the data 270 as part of the process of adding an item into the store inventory for the first time. This could be provided as a consulting service to companies who purchase or lease a robobox 100. With this detailed and accurate information, the robobox 100 is ready for the items before they arrive. The detailed product documentation, which is made available through all of the interactive ordering interfaces, will be more helpful to customers than the average big box retail clerk.

Because automated order picking is exactly what roboboxes 100 are built to do, a robobox can do on-demand order picking far better than any store employing humans for that purpose. After an order has been placed and paid for online, that order can be stored until the shopper is near a robobox 100 at which point it will be picked in a matter of minutes and ready for pickup. In mobile device implementations, the application may detect that it is within a predetermined distance from a robobox 100 that can fulfill the order and may ask the user if they want to pick up their order. If the user accepts, the order may be picked for pickup by the user at the robobox 100.

For example, a user might buy soap online from a pharmacy the next time they notice that they are running low. The next time the user (or anyone attached to an account associated with the user) passes within a few miles of any robobox 100 associated with the pharmacy, the application 220 may ask if the user would like to pick up the order. Orders can be picked in predictable time so the application 220 can know approximately when the order will be ready. It will send another message as soon as the order is ready for pickup.

In another implementation, the robobox 100 may be integrated into a truck or vehicle. Based on addresses or delivery locations associated with orders received by the robobox 100 (or the actual current locations of the users associated with the orders), the vehicle may drive to each location and may pick the items corresponding to each order associated with the location.

When the vehicle arrives at a location near a user associated with an order, the application 220 associated with the user may alert the user that their orders are ready for pickup at the vehicle, or may give the user an approximate time when the vehicle will arrive. The user may then confirm that they will meet the truck for pickup, may decline to pick up the order at this time, or may suggest a time that is better for the user. The vehicle may dynamically adjust its route and stopping locations based on the orders as they are received from the applications 220. The vehicle may have a driver, or may be self-driving.

For example, a robobox 100 may be placed on truck that continuously drives around a city such as Philadelphia. When a user in Philadelphia places an order using the application 220, the robobox 100 may add the order to an order queue. The queue may be dynamically updated based on the current location of the vehicle and the locations associated with the orders in the queue so that orders may be fulfilled as fast as possible. Other information such as weather or traffic conditions may also be considered. Based on the queue, the vehicle may determine which location to go to next.

Figure 7:
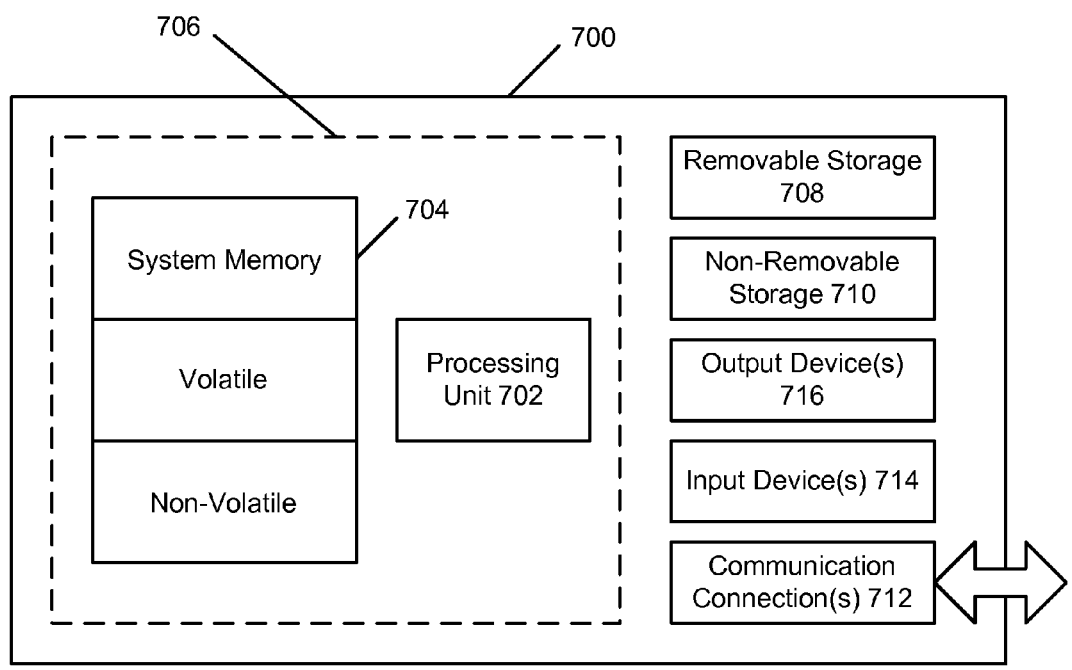
FIG. 7 shows an exemplary computing environment in which example embodiments and aspects may be implemented.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing system 700. In its most basic configuration, computing system 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing system 700 may have additional features/functionality. For example, computing system 700 may include additional storage (removable and/or non-removable) including, but not limited to, magnetic or optical disks or tape. Such additional storage is illustrated in FIG. 7 by removable storage 708 and non-removable storage 7.

Computing system 700 typically includes a variety of computer readable media. Computer readable media can be any available media that can be accessed by computing system 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 800. Any such computer storage media may be part of computing system 800.

Computing system 700 may contain communication connection(s) 712 that allow the device to communicate with other devices and/or interfaces. Computing system 700 may also have input device(s) 714 such as a keyboard (software or hardware), mouse, pen, voice input interface, touch interface, etc. Output device(s) 716 such as a display, speakers, printer, etc. may also be included. All these devices are, well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   one or more shelf assemblies, wherein each shelf assembly comprises a plurality of shelves, and each shelf is adapted to store a plurality of bins, and each bin is adapted to store an item of a plurality of items;
   one or more pickers, wherein each picker is adapted to remove a bin stored on a shelf; and
   a computing device adapted to:
   receive an order, wherein the order identifies an item of the plurality of items;

determine a shelf assembly and shelf where a bin that stores the identified item is located;

select a picker of the one or more pickers to remove the bin corresponding to the determined shelf assembly and shelf, wherein the computing device selects the picker of the one or more pickers to remove the bin corresponding to the determined shelf assembly and shelf by selecting a least busy picker of the one or more pickers; and instruct the selected picker to remove the bin at the determined shelf assembly and shelf.

2. The system of claim 1, wherein the order is received from an application of a mobile device.

3. The system of claim 1, wherein the system further comprises one or more ordering chutes and the computing device is further adapted to place the removed bin at one of the one or more ordering chutes.

4. The system of claim 1, wherein the computing device is adapted to recommend one or more items of the plurality of items based on the item associated with the order.

5. The system of claim 1, wherein each item of the plurality of items is associated with a price, and the computing device is further adapted to dynamically change the prices associated with one or more items of the plurality of items based on one or more of a time, a data of the week, a date, past order data, and a number of each item remaining.

6. The system of claim 1, wherein the system further comprises a housing and a customer ordering interface, wherein the customer ordering interface includes a touch screen and a credit card reader.

7. The system of claim 6, wherein the housing is approximately the same size as a shipping container, and the housing includes at least one transparent portion.

8. The system of claim 1, wherein the computing device is further adapted to display item information to a user on one or more of a mobile application or a customer ordering interface, wherein the item information for an item includes a price, and further wherein the computing device is further adapted to determine the price for an item based on one or more of a time, a data of the week, a date, a number of each item remaining, and an order history associated with the user.

9. The system of claim 8, wherein the computing device is further adapted to identify the user based on one of a user loyalty card, a provided user account identifier, or using facial recognition.

10. The system of claim 1, wherein the computing device is adapted to maintain inventory data that identifies the plurality of items, adjust the inventory based on items removed by the one or more pickers, and to periodically provide the inventory to a server.

11. The system of claim 10, wherein the computing device is adapted to determine a probability that an item of the plurality of items will be ordered based on the inventory data, and for each item of the plurality of items, select a shelf assembly of the one or more shelf assemblies and a shelf of the plurality of shelves of the selected shelf assembly to store a bin that includes the item based on the determined probability.

12. The system of claim 11, wherein the selected shelf assembly and selected shelf are selected for each item of the plurality of items so that items with high probabilities are stored in bins on the one or more shelf assemblies and shelves that are closer to the one or more pickers, while items with lower probabilities are stored in bins on the one or more shelf assemblies and shelves that are farther from the one or more pickers.

13. The system of claim 11, wherein the computing device is adapted to instruct the one or more pickers to re-arrange the bins storing the plurality of items based on the selected shelf assembly and selected shelf.

14. The system of claim 1, wherein the computing device is further adapted to:
receive a digital representation of an object;
extract one or more features of the digital representation of the object;
determine one or more items of the plurality of items that match one or more of the one or more features;
and provide identifiers of the matching one or more items of the plurality of items.

15. The system of claim 14, wherein the digital representation is a digital image and is received from an application of a mobile device.

16. The system of claim 14, wherein the system includes a scanner, the object is placed in the scanner, and the digital representation is received from the scanner.

17. The system of claim 14, wherein the computing device is further adapted to:
determine an item that matches the one or more features, wherein the item is not one of the plurality of items;
ask if a user associated with the object would like to order the determined item; and
based on a received response, record an order for the determined item at an address associated with the user.

18. The system of claim 14, wherein the object is a screw, and the one or more features are a thread count of the screw.

19. A system comprising:
one or more shelf assemblies, wherein each shelf assembly comprises a plurality of shelves;
one or more pickers; and
a computing device adapted to:
receive a manifest, wherein the manifest identifies a plurality of items to be added;
receive an identifier of an item;
determine that the identified item is identified by manifest; and
in response to the determination that the identified item is identified by the manifest:
determine a shelf assembly of the plurality of assemblies;
determine a shelf of the determined shelf assembly;
select a picker of the one or more pickers;
instruct the selected picker to collect the identified item; and
instruct the selected picker to place the identified item at the determined shelf assembly at the determined shelf.

20. A system comprising:
one or more shelf assemblies, wherein each shelf assembly comprises a plurality of shelves, and each shelf is adapted to store one or more items of a plurality of items;
one or more pickers, wherein each picker is adapted to remove an item of the one or more items stored on a shelf of the plurality of shelves; and
a computing device adapted to:
receive an order, wherein the order identifies an item of the plurality of items;
determine a shelf assembly and shelf where the identified item is located;
select a picker of the one or more pickers to remove the identified item, wherein the computing device selects a picker of the one or more pickers to remove the identified item based on a busyness of the one or more pickers; and instruct the selected picker to remove the identified item at the determined shelf assembly and shelf.

* * * * *